US010037416B2

(12) United States Patent
Biswas

(10) Patent No.: US 10,037,416 B2
(45) Date of Patent: Jul. 31, 2018

(54) METHOD AND APPARATUS FOR LICENSING WEB ASSETS

(71) Applicant: Adobe Systems Incorporated, San Jose, CA (US)

(72) Inventor: Sanjeev Kumar Biswas, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 951 days.

(21) Appl. No.: 13/909,476

(22) Filed: Jun. 4, 2013

(65) Prior Publication Data

US 2014/0358802 A1    Dec. 4, 2014

(51) Int. Cl.
| | | |
|---|---|---|
| *G06F 21/12* | (2013.01) | |
| *G06Q 20/12* | (2012.01) | |
| *G06Q 30/04* | (2012.01) | |
| *G06Q 50/00* | (2012.01) | |
| *G06Q 50/18* | (2012.01) | |

(52) U.S. Cl.
CPC ....... *G06F 21/128* (2013.01); *G06Q 20/1235* (2013.01); *G06Q 50/00* (2013.01); *G06Q 50/18* (2013.01)

(58) Field of Classification Search
USPC ...................................................... 705/50–79
See application file for complete search history.

(56) References Cited

U.S. PATENT DOCUMENTS

| | | | | |
|---|---|---|---|---|
| 5,859,648 | A  * | 1/1999 | Moore | G06F 17/214 |
| | | | | 345/471 |
| 6,298,446 | B1 * | 10/2001 | Schreiber | G06F 17/211 |
| | | | | 726/27 |
| 7,010,587 | B1 * | 3/2006 | Shiimori | H04N 1/00132 |
| | | | | 358/1.11 |
| 7,831,517 | B1 | 11/2010 | Vijay et al. | |
| 8,725,650 | B2 * | 5/2014 | Mowatt | G06Q 10/10 |
| | | | | 705/50 |
| 8,863,294 | B2 * | 10/2014 | Lee | G06F 21/105 |
| | | | | 726/26 |
| 2004/0025155 | A1 | 2/2004 | Sedlack et al. | |
| 2004/0177056 | A1 * | 9/2004 | Davis | G06F 17/214 |

(Continued)

FOREIGN PATENT DOCUMENTS

| | | |
|---|---|---|
| CN | 102324009 A | 1/2012 |
| JP | 2011065618 A | 3/2011 |
| KR | 20070027080 A | 3/2007 |

OTHER PUBLICATIONS

Elliot Jay Stocks, "Using Web Fonts in Desktop Design Apps", downloaded from: http:elliotjaystocks.com/blog/web-fonts-in-desktop-applications/, Mar. 22, 2011, 15 pgs.

(Continued)

*Primary Examiner* — James D Nigh
*Assistant Examiner* — Margaret M Neubig
(74) *Attorney, Agent, or Firm* — Keller Jolley Preece

(57) ABSTRACT

A computer implemented method and apparatus for licensing web assets. The method comprises loading a web asset for use by one or more software applications when an entitlement to use the web asset exists for a first user of the web asset, wherein the entitlement defines a purchased license to the web asset, and wherein the web asset is use agnostic.

19 Claims, 3 Drawing Sheets

(56) References Cited

U.S. PATENT DOCUMENTS

| | | |
|---|---|---|
| 2005/0033652 A1 | 2/2005 | Brentano et al. |
| 2006/0253395 A1 | 11/2006 | Corbell |
| 2007/0226150 A1 | 9/2007 | Pietrzak et al. |
| 2009/0037287 A1 | 2/2009 | Baitalmal et al. |
| 2010/0268950 A1 | 10/2010 | Qu et al. |
| 2011/0047540 A1 | 2/2011 | Williams et al. |
| 2011/0225417 A1* | 9/2011 | Maharajh ............... G06F 21/10 713/150 |
| 2012/0284804 A1 | 11/2012 | Lindquist et al. |

OTHER PUBLICATIONS

"Web Font EULA", downloaded from: http://www.fonts.com/info/legal/eula/web-fonts, 5 pgs.

"FontGuard Piracy Prevention System", downloaded from: http://letterheadfonts.com/piracy/fontguard.php, 3 pgs.

\* cited by examiner

METHOD AND APPARATUS FOR LICENSING WEB ASSETS

BACKGROUND OF THE INVENTION

Field of the Invention

Embodiments of the present invention generally relate to software licensing and, more particularly, to a method and apparatus for licensing web assets.

Description of the Related Art

Software licensing has become commonplace for companies, such as ADOBE® Systems Incorporated. Typically, when a user licenses a software application, the license is validated for the software application each time the software application is executed. If the license for the software application has expired, the application does not run. Web assets, such as specialized fonts, cascading style sheets (css), images, and the like, are digital text, media or multimedia files that also include a right to use. Web assets are typically not purchased in conjunction with a specific software application, and are purchased and licensed separately from applications with which they can be used. Once purchased, web assets can be shared among multiple software applications. Web assets differ from features of a software application in that when a feature of a software application is modified or added, the software application is impacted by the change. However, additions or modifications to web assets have no impact on the software applications in which they may be used. Web asset files are use agnostic, that is, uncommitted to and independent of any particular use, and are typically stored and accessed individually in a computer memory.

Rights management for web assets is a difficult task. Because a web asset is not protected within a software application, anyone may download and use it. For example, a user may create a document using ADOBE® INDESIGN® including a specialized font that the user has licensed, whether through a trial, perpetual or subscription purchase. When the user shares that document with a second user who has not purchased a license to the specialized font, the second user cannot view the areas of the document that used the specialized font because the specialized font is not on the second user's machine. However, it is easy for the second user to download the unlicensed font by copying them from the user who created the document. This results in a loss of revenue for the company that owns the web asset.

Therefore, there is a need for an improved method and apparatus for licensing web assets.

SUMMARY OF THE INVENTION

A method and apparatus for licensing web assets substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
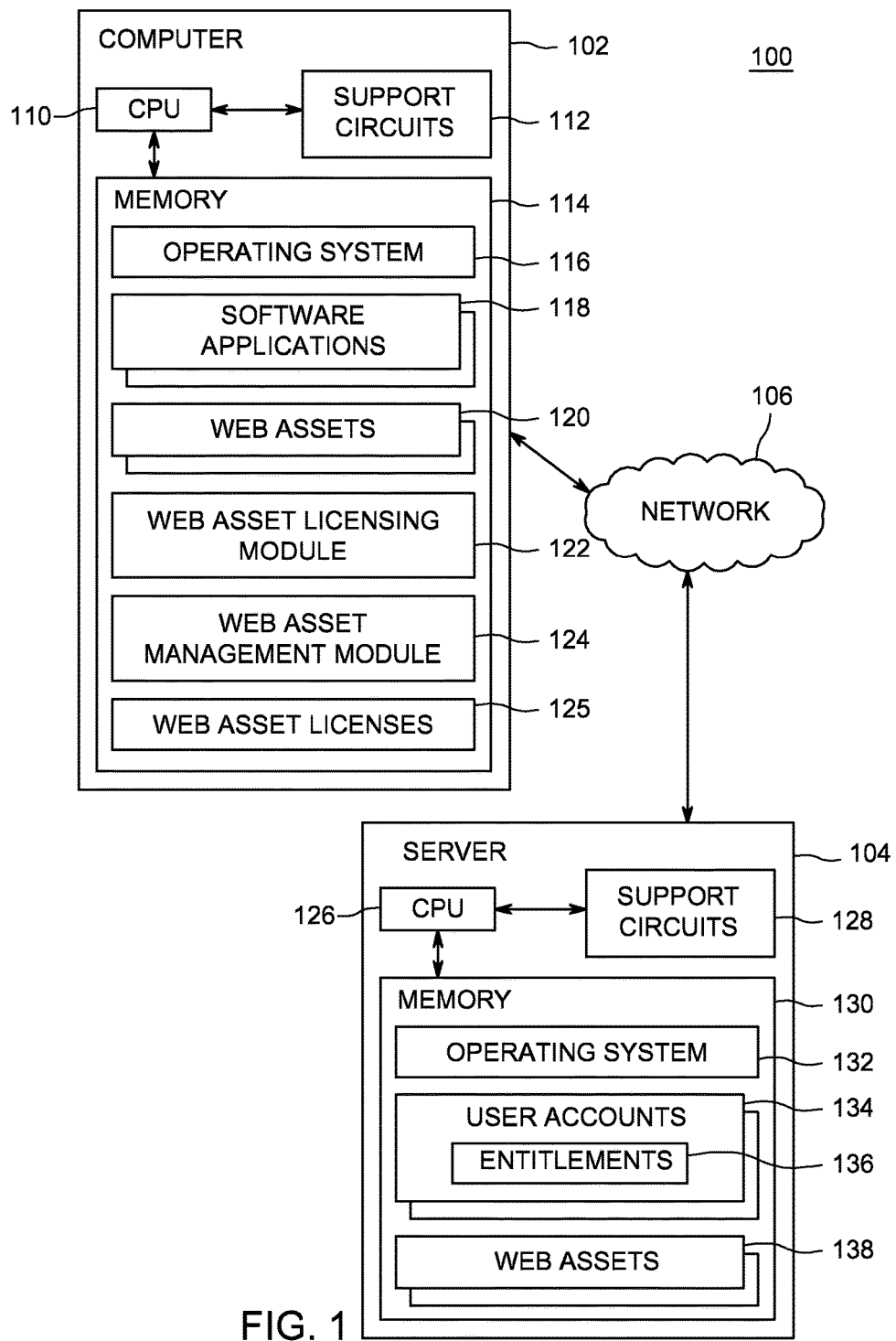
FIG. 1 is a block diagram of a system for licensing web assets, according to one or more embodiments.

While the method and apparatus is described herein by way of example for several embodiments and illustrative drawings, those skilled in the art will recognize that the method and apparatus for licensing web assets is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for licensing web assets defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. As used herein, the term "web asset" includes a single web asset or a collection of two or more web assets.

DETAILED DESCRIPTION OF EMBODIMENTS

Embodiments of the present invention include a method and apparatus for licensing web assets. A web asset is any form of digital copyrightable material, such as specialized fonts, cascading style sheets (css), images, audio files, articles, and the like, that are digital text, media or multimedia files that also include a right to use. The embodiments enable a user to purchase a license for one or more web assets. A web asset collection may be, for example, a collection of 50 fonts, a collection of 5 images, and/or the like. The license may be a perpetual license, a monthly subscription, an annual subscription, or any license made available for purchase by a web asset provider.

When a user purchases a web asset, an entitlement for the purchased web asset is stored on a provider's server in a user account. When the user is ready to install the web asset on the user's computer, a web asset management module of the user's computer determines if a web asset license for the web asset exists on the user's computer. If one does not exist, the web asset licensing module determines whether an entitlement exists for the user for the web asset, and if it does, a valid activated license is sent from the provider's server to the user's computer. After the active license for the web asset for the userID is stored on the user's computer, the web asset is installed on the user's computer. The web asset is use agnostic, meaning it is not committed to any specific use by any particular application. Rather, the web asset is independent and may be incorporated into a document using any software application that will accept it or it may be used on its own. Hence, the web asset provider may add and delete web assets without affecting any software applications.

When a software application is launched from the user's computer, and attempts to use a web asset, the web asset licensing module performs a license check to ensure the user's entitlement has not expired. If the entitlement exists for the user, the software application loads the web asset for use in the software application. However, if the web asset licensing module finds that the user's entitlement has expired for the web asset, the web asset is removed from the computer.

Advantageously, the present invention provides piracy protection to the web asset provider for web assets. More specifically, a web asset is not loaded for use by a software application until the software application determines that the user of the software application has an entitlement to use the web asset. Not only is access to the web asset denied to a user without an entitlement, but additionally, if the web asset had been previously installed on a user's computer that now has no entitlement; they are removed from the user's computer, thereby protecting a provider's interest in their web asset products.

Various embodiments of a method and apparatus for licensing web assets are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for licensing at least one web asset, according to one or more embodiments. The system 100 includes a computer 102, a server 104, communicatively coupled to one another over a network 106. The computer 102 is a type of a desktop computer. The computer 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, one or more software applications 118, one or more web assets 120, and a web asset licensing module 122. The operating system 116 may include various commercially known operating systems. The software applications 118 may be any software application that makes use of web assets, ADOBE® INDESIGN®, ADOBE® Cooltype, or applications provided as part of the ADOBE® CREATIVE CLOUD™, and the like.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

The server 104 is a type of computing device known to one of ordinary skill in the art that is used for providing computing services within the cloud, e.g., a blade server, virtual machine, and the like. Although the embodiments discussed here involve a cloud server, one skilled in the art will appreciate the invention may also be performed on the client computer 102. The CPU 126 may include one or more commercially available microprocessors or microcontrollers that facilitate data processing and storage. The various support circuits 128 facilitate the operation of the CPU 126 and include one or more clock circuits, power supplies, cache, input/output circuits, displays, and the like. The memory 130 includes at least one of Read Only Memory (ROM), Random Access Memory (RAM), disk drive storage, optical storage, removable storage and/or the like. The memory 130 includes an operating system 132, a plurality of user accounts 134, wherein each user account 134 may include one or more entitlements 136. The server 104 also includes a plurality of web assets 138. A web asset, as noted above, is any copyrightable material, such as a font, an image, a map, an audio file, article, a multi-media file, and the like that also includes a right to use.

The web assets 138 are defined and stored on the server 104 by a provider of the web assets 138. The provider may add or modify web assets 138. The provider may identify each web asset 138 based on purchasing options for the web asset 138. For example, a web asset 138 may be identified as free, as available for inclusion of purchase of a membership with other services, as a perpetual sale, or as a subscription. An identifier, for example, a stock keeping unit (SKU) is associated with each web asset 138, which may be used to identify the web asset 138 during purchase. For example, a first SKU may identify a font sold as a monthly subscription, while a second SKU may identify the same font sold as an annual subscription.

A user of the computer 102 may purchase one or more web assets 138 from the provider. In order to make a purchase, the user must be logged into the provider's server using an identifier, such as a userID. Upon successful payment for a web asset 138, where the payment method may be any payment method used by a provider, an entitlement 136 for the purchased web asset 138 is stored in the user account 134 associated with the userID. When the user is ready to install the web asset 120 on the computer 102, the web asset management module 124 determines if a digital web asset license 125 for the web asset 120 already exists on the computer 102. A digital web asset license 125 is an encrypted document that identifies the web asset 138 for which the license applies and an expiry status for the entitlement 136. If the web asset is a collection of web assets 138, all of the web assets 138 are identified in the digital web asset license 125. If a digital web asset license 125 does not exist, the web asset management module 124 sends a query to the server 104 to ensure that an entitlement 136 exists for the user for the web asset 120. If an entitlement 136 exists for the userID, the web asset management module 124 retrieves a valid activated web asset license 125 from the server 104. It is important to note that the web asset 120 may only be used by a software application 118 if an associated web asset license 125 exists on the computer 102. After the active license 125 for the web asset 120 for the userID is stored on the computer 102, the web asset management module 124 installs the web asset 138 onto the computer 102 as web asset 120.

When a software application 118 is launched from the computer 102, or any computer 102 having a software application 118 using a web asset 120, and attempts to use a web asset 120, the web asset licensing module 122 performs a license check to ensure the user of software application 118 has an entitlement 136 that has not expired. If the entitlement 136 exists for the user, the software application 118 provides the web asset 120 for a user to incorporate using the software application 118. However, if the web asset licensing module 122 finds that the user has an expired entitlement 136 for the web asset 120, the web asset licensing module 122 removes the web asset 120 from the computer 102.

Figure 2:
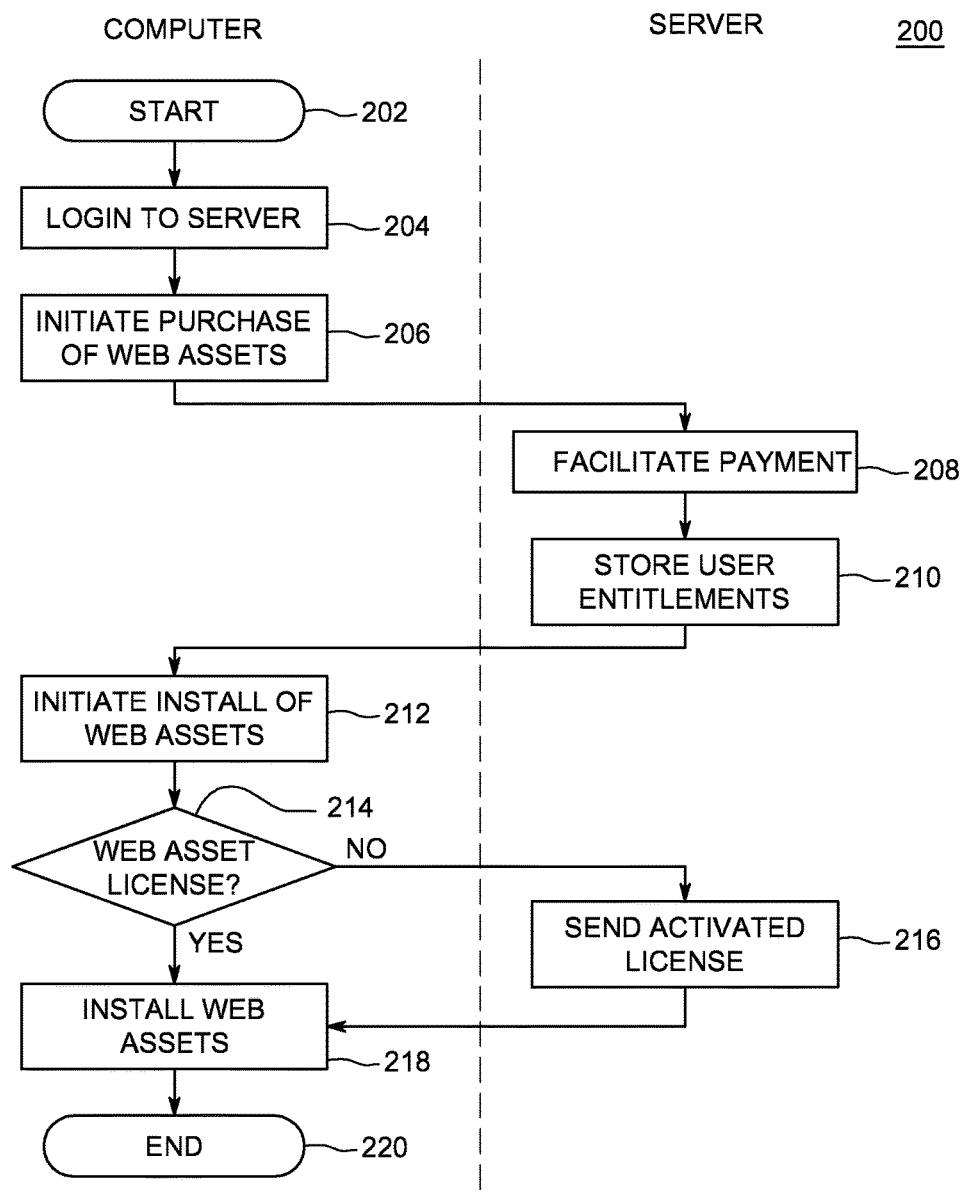
FIG. 2 depicts a flow diagram of a method for purchasing web assets as performed by the web asset management module of FIG. 1, according to one or more embodiments.

FIG. 2 depicts a flow diagram of a method 200 for purchasing web assets as performed by the web asset licensing module 122 and web asset management module 124 of FIG. 1, according to one or more embodiments. The method 200 facilitates the purchase and installation of web assets. The method 200 starts at step 202 and proceeds to step 204.

At step 204, the method 200 facilitates a user login to a provider server. The provider server contains a plurality of web assets that are available for purchase by the user. The user logs into the provider server using a user identifier, such as a userID. The userID is associated with a user account. If the user does not have a userID, the user may create an account with an associated userID. When a user purchases a web asset, an entitlement is stored on the provider server in the user account associated with the userID.

The method 200 proceeds to step 206, where the method 200 facilitates the initiation of a purchase of one or more web assets. The web asset provider may identify each web asset based on, for example, purchasing options for the web asset. For example, a web asset may be identified as free, as available for inclusion of purchase of a membership with other services, as a perpetual sale, or as a subscription. An identifier, for example, a stock keeping unit (SKU) is associated with each web asset, which may be used to by the provider to identify the web asset during purchase. For example, a first SKU may identify a font sold as a monthly subscription, while a second SKU may identify the same font sold as an annual subscription.

One or more web assets may be selected for purchase via a user interface provided by the web asset provider. When the one or more web assets are selected for purchase, the method 200 proceeds to step 208, where the method 200 facilitates payment of the one or more web assets. The payment may be completed using any payment method accepted by the web asset provider. Upon successful payment, the method 200 proceeds to step 210, where the method 200 stores the user entitlement for the purchased web asset in a user account associated with the userID.

In addition to the web asset that is purchased by the user, the entitlement may include a duration or an expiration date for the entitlement. For example, if a user purchases a trial version of the web asset, the duration may be for a predetermined period of time, for example, one month. If the user purchases a monthly or annual subscription to the web asset, an expiration date may be included with the entitlement.

The method 200 proceeds to step 212, where the method 200 initiates installation of the web asset. Initiation of installation may be, for example, immediate, upon receipt of a request of a user, upon execution of a software application, or automatically after a predefined time period after purchase. Upon initiation of installation, the method 200 proceeds to step 214, where the method 200 determines whether an active web asset license for the web asset is present on the computer. If no web asset license is present for the web asset, the method 200 proceeds to step 216, the method 200 facilitates sending an activated web asset license from the provider server to the computer.

The method 200 proceeds to step 218, where the method 200 installs the web asset on the computer. The method 200 proceeds to step 220 and ends.

Figure 3:
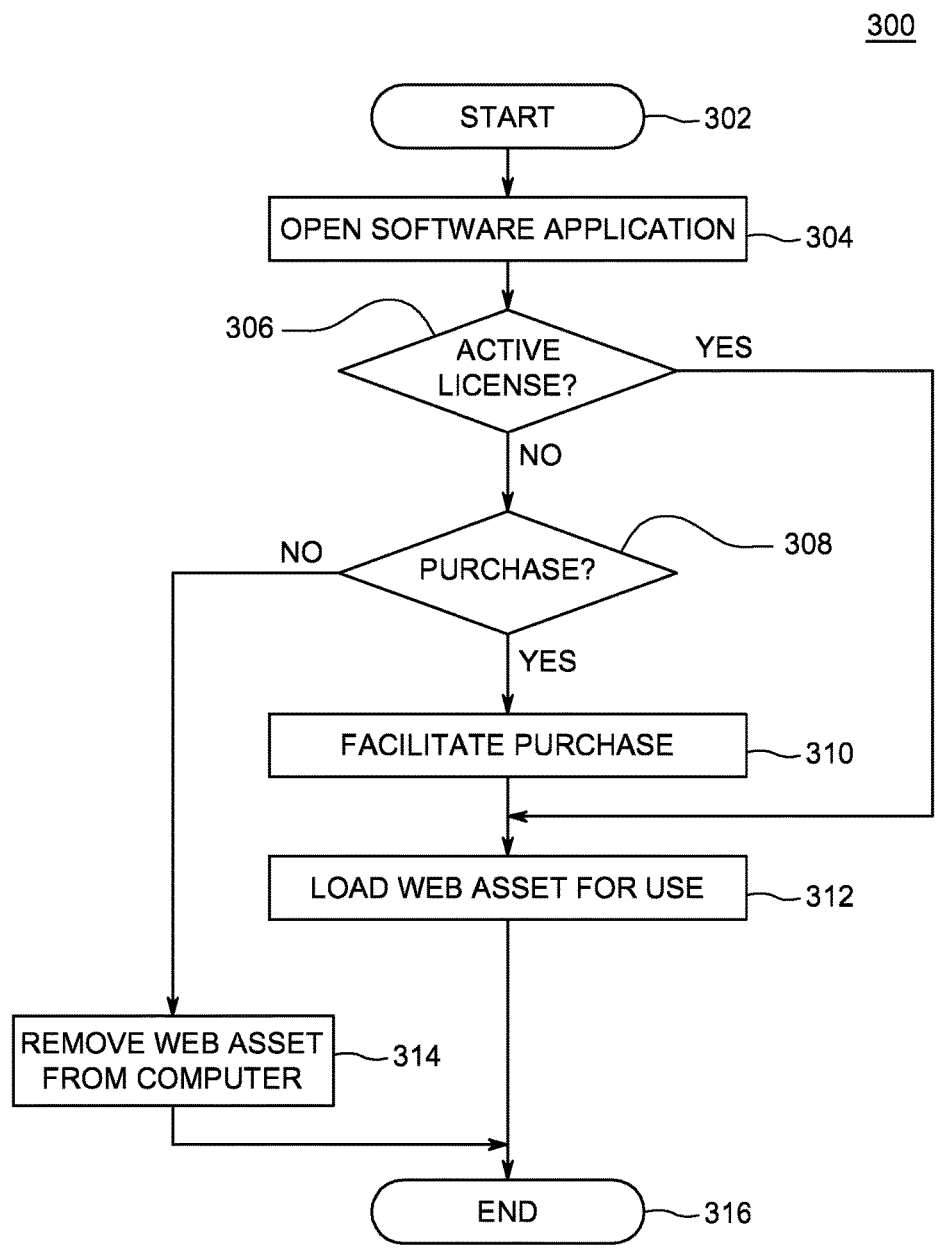
FIG. 3 depicts a flow diagram of a method for using web assets as performed by the web asset licensing module of FIG. 1, according to one or more embodiments.

FIG. 3 depicts a flow diagram of a method 300 for using a web asset as performed by the web asset licensing module 122 of FIG. 1, according to one or more embodiments. The method 300 ensures a user is entitled to use a web asset before loading the web asset for use within a software application. It is noted that the user who accesses a document that includes one or more web assets may be different from the user who initially created the document. In addition, the user who initially created the document using a web asset may have used a first software application and the second user who accesses the document that includes the web asset may open the document with a second software application that is different from the first software application. For example, a user may create a document that contains a licensed video clip for which the user has an entitlement using ADOBE® ACROBAT® PRO. A second user may open that document using ADOBE® READER. If the second user does not have an entitlement to the licensed video clip, the method 300 offers the second user the option to purchase the video clip and if the second user chooses not to purchase the video clip, the method 300 does not allow the second user to view the video clip, but may display replacement content to the second user. Similarly, if the user who initially created the document allows their entitlement for the video clip to lapse, the method 300 does not allow the user to view the video clip. The method 300 starts at step 302 and proceeds to step 304.

At step 304, the method 300 opens a software application in response to a command. The command may be in the form of a user selecting the software application for execution or the command may be received when a user attempts to open a document that must be opened with the software application.

The method 300 proceeds to step 306, where the method 300 determines whether there exists one or more active web asset licenses on the user computer. Each web asset license is a license for a specific web asset. As noted previously, the web asset may be a single web asset or a collection of web assets. For each web asset license, the method 300 queries a provider server to determine if one or more web asset licenses for that user are active or if one or more entitlements have expired. For each web asset license that has active (non-expired) entitlements, the method 300 proceeds to step 312, where the method 300 loads the entitled web assets that are included in the web asset licenses for use with the software application and then proceeds to step 316, where the method 300 ends.

However, if at step 306, the method 300 determines that one or more web asset licenses have entitlements that have expired or no entitlements at all, the method 300 proceeds to step 308, where the method 300 queries the user to determine whether the user would like to purchase a web asset license or extend a subscription for each expired web asset license. If the method 300 determines that the user would like to purchase a new license or license extension, the method 300 proceeds to step 310, where the method 300 facilitates the purchase as described with respect to FIG. 2 above. The method 300 then proceeds to step 312, where the method 300 loads the web asset for use with the software application and then proceeds to step 316, where the method 300 ends.

If at step 308, the method 300 determines that a user does not wish to purchase or extend a subscription to the web asset without an entitlement, the method 300 proceeds to step 314. At step 314, the method 300 removes the web asset from the user's computer. When the web asset is removed from the user's computer and the user opens a document containing the web asset, the web asset with the expired entitlement appears distorted. In some embodiments, the web asset appears faded in the document. In some embodiments, the web asset is not displayed in the document. In some embodiments, for example, if the web asset is a video clip, the clip is visible in static form, but the clip may not be played. In some embodiments, a substitute for the web asset is displayed in the document. For example, if the web asset is a specialized font and the entitlement has expired, the document may be displayed in a free generic or default font. In some embodiments, the document creator may specify how or what is displayed when the entitlement does not exist. The method 300 proceeds to step 316, where the method 300 ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   in response to a command selecting a software application for execution on a computing device, determining whether one or more active web asset licenses exist on the computing device, wherein the software application is enabled to use one or more web assets;
   sending, over a network to a server, a request to verify entitlements associated with a first web asset license for a first plurality of web assets and a second web asset license for a second plurality of web assets, wherein the entitlements are stored on the server and associated with a user account;
   receiving, from the server over the network, a response indicating that one or more first entitlements associated with the first web asset license are inactive and that one or more second entitlements associated with the second web asset license are active;
   in response to receiving the response indicating that the one or more first entitlements are inactive, deleting, from the computing device, a first web asset of the first plurality of web assets;
   in response to receiving the response indicating that the one or more second entitlements are active, loading, on the computing device, at least one of the second plurality of web assets for use with the software application; and
   opening, by one or more processors, a document containing references to the first web asset and displaying a second web asset from the loaded at least one of the second plurality of web assets in place of the first web asset within the document.

2. The method of claim 1, further comprising providing an option to purchase an entitlement for the first web asset.

3. The method of claim 2, wherein deleting the first web asset is further in response to verifying that the option to purchase the entitlement for the first web asset has been rejected.

4. The method of claim 1, wherein displaying the second web asset comprises displaying a web asset indicated by a creator of the document for display when the one or more first entitlements are inactive or do not exist.

5. The method of claim 1, wherein the first web asset is an asset that is not part of the software application, but is licensed separate from the software application and is compatible with one or more additional software applications.

6. The method of claim 2, wherein the first web asset is a first digital font and the second web asset is a second default digital font.

7. The method of claim 1, further comprising in response to opening, by the one or more processors, an additional document containing an additional web asset from the loaded at least one of the second plurality of web assets, displaying the additional web asset within the additional document.

8. A system for licensing web assets comprising:
   at least one processor; and
   a non-transitory storage medium comprising instructions that, when executed by the at least one processor, cause the system to perform the steps of:
   in response to a command selecting a software application for execution on the system, determining whether one or more active web asset licenses exist on the system, wherein the software application is enabled to use one or more web assets;
   sending, over a network to a server, a request to verify entitlements associated with a first web asset license for a first plurality of web assets and a second web asset license for a second plurality of web assets, wherein the entitlements are stored on a server and associated with a user account;
   receiving, from the server over the network, a response indicating that one or more first entitlements associated with the first web asset license are inactive and that one or more second entitlements associated with the second web asset license are active;
   in response to receiving the response indicating that the one or more first entitlements are inactive, deleting, from the system, a first web asset of the first plurality of web assets;
   in response to receiving the response indicating that the one or more second entitlements are active, loading, on the system, at least one of the second plurality of web assets for use with the software application; and
   opening a document containing references to the first web asset and displaying a second web asset from the loaded at least one of the second plurality of web assets in place of the first web asset within the document.

9. The system of claim 8, further comprising instructions that, when executed by the at least one processor, cause the system to perform the step of providing an option to purchase an entitlement to use the first web asset.

10. The system of claim 9, wherein deleting the first web asset is further in response to verifying that the option to purchase the entitlement to use the first web asset has been rejected.

11. The system of claim 8, wherein the first web asset is an asset that is not part of the software application, but is licensed separate from the software application and is compatible with one or more additional software applications other than the software application.

12. The system of claim 9, wherein the first web asset is a first digital font and the second web asset is a second default digital font.

13. The system of claim 8, further comprising instructions that, when executed by the at least one processor, cause the system to perform the step of opening an additional document containing an additional web asset from the loaded at least one of the second plurality of web assets and display the additional web asset within the additional document.

14. A non-transitory storage medium comprising instructions that, when executed by at least one processor of a computing device, cause the at least one processor to perform steps comprising:
   in response to a command selecting a software application for execution on the computing device, determining whether one or more active digital font licenses exist on the computing device, wherein the software application is enabled to use one or more web assets;
   sending, over a network to a server, a request to verify entitlements associated with a first digital font license for a first plurality of digital fonts and a second digital font license for a second plurality of digital fonts,
   receiving, from the server over the network, a response indicating that one or more first entitlements associated with the first digital font license are inactive and that one or more second entitlements associated with the second digital font license are active;

in response to receiving the response indicating that the one or more first entitlements are inactive, deleting, from the computing device, a first digital font of the first plurality of digital fonts;

in response to receiving the response indicating that the one or more second entitlements are active, loading, on the computing device, at least one of the second plurality of digital fonts for use with the software application; and opening a document containing references to the first digital font and displaying text in the document in a second default digital font from the loaded at least one of the second plurality of digital fonts in place of the first digital font.

15. The non-transitory storage medium of claim 14, further comprising instructions that, when executed by the at least one processor, cause the computing device to perform steps comprising:

receiving, from the server over the network, a response indicating that the one or more first entitlements are active; and opening the document containing the first digital font and displaying text in the document in the first digital font.

16. The non-transitory storage medium of claim 14, further comprising instructions that, when executed by the at least one processor, cause the computing device to provide an option to renew the one or more first entitlements.

17. The non-transitory storage medium of claim 16, wherein deleting the first digital font is further in response to verifying that the option to renew the one or more first entitlements has been rejected.

18. The non-transitory storage medium of claim 14, further comprising instructions that, when executed by the at least one processor, cause the computing device to perform steps comprising:

opening an additional document containing an additional digital font from the loaded at least one of the second plurality of digital fonts and displaying an additional text within the additional document in the additional digital font.

19. The non-transitory storage medium of claim 14, wherein the first digital font is not part of the software application, but is licensed separate from the software application and is compatible with one or more additional software applications other than the software application.

* * * * *